April 6, 1965 J. GROAK 3,177,287

SYSTEM FOR REPRODUCTION OF RECORD IMAGES

Filed Oct. 5, 1959 3 Sheets-Sheet 1

April 6, 1965 J. GROAK 3,177,287

SYSTEM FOR REPRODUCTION OF RECORD IMAGES

Filed Oct. 5, 1959 3 Sheets-Sheet 3

INVENTOR
Josef Groak
BY
Marshall, Wilson, Click, & Yeasting
ATTORNEYS

United States Patent Office 3,177,287
Patented Apr. 6, 1965

3,177,287
SYSTEM FOR REPRODUCTION OF RECORD IMAGES

Josef Groak, London, England, assignor to Leslie Farrer-Brown, London, England

Filed Oct. 5, 1959, Ser. No. 844,576
Claims priority, application Great Britain, Oct. 24, 1958, 34,192
6 Claims. (Cl. 178—5.6)

The present invention relates to the reproduction of recorded images and is concerned with such reproduction effected with the aid of a television receiver.

Of recent years much effort has been devoted to recording television programmes since it is undesirable to be limited to transmitting live programmes. In some methods the video signals are recorded magnetically upon tape and in other methods the pictures are recorded photographically. In either case however the methods are only suitable for professional use and no system has been developed which is suitable for domestic use.

It is an object of this invention to provide a system for reproducing recorded images which makes it possible for ordinary domestic users to reproduce recorded images on a television receiver as and when desired, the equipment necessary being of such of such a nature that it need not be prohibitively bulky, complicated or expensive.

According to the invention there is provided in combination a television receiver including a picture display means, a storage-type television camera tube, means for causing the scanning means of the picture display means and the camera tube to operate synchronously, means for modulating signals generated by the camera tube on to a carrier and for applying the modulated carrier to the receiver and means for supporting a loop of base material bearing a helical track of picture frames adjacent the camera tube and for effecting relative motion between the loop and the tube in such a manner that the picture frames are scanned successively by the camera tube, whereby the images recorded on the loop are displayed successively on the picture display means.

The use of a storage-type camera tube, for instance a Vidicon, obviates the necessity of synchronising the motion of the film with the scanning means of the camera tube. This simplifies the apparatus considerably.

The means for supporting the loop and effecting the necessary relative motion can be simple to operate by reason of the nature of the loop and the manner in which picture frames are recorded thereon. The loop preferably also bears a magnetic track associated with the picture frames.

The loop may be fed past the camera tube in any suitable way. It may be preferred however to mount the loop on a drum which is rotated, the camera tube being moved along the axis of the drum by means of a lead screw in order that the necessary relative motion may be obtained for scanning the helical track of frames. Matter may be so arranged that the loop is simply slipped on to the drum and located by means of pegs in the drum and perforations in the loop or notches in the edges of the loop. In this way loading the apparatus can be made a simple operation as it is important that it should be when the apparatus is for domestic use.

The scanning means of the camera tube can be operated from the time-base circuits in the receiver and synchronism be attained in this way. However, this may overload the receiver time-base circuits and other difficulties are also encountered. It is of course necessary to take leads from the receiver circuits to the camera tube circuits and this complicates adaptation of existing receivers to the system of the invention.

It is preferred to use a separate waveform generator which supplies operating potentials to the scanning means of the camera tube and superimposes conventional synchronising pulses on the carrier wave fed to the receiver as well as generating the carrier wave. In this way it is possible to construct a self-contained auxiliary apparatus comprising the waveform generator, the means for supporting and moving the loop and the camera tube, which merely has an output lead to be plugged into an existing receiver in place of an aerial lead. The carrier frequency chosen would of course be one upon which receivers are currently adapted to operate.

This self-contained auxiliary apparatus adapts a television receiver to enable picture records to be reproduced in the some way that a radio set may be adapted to reproduce sound records by means of an auxiliary turntable. Continuing the analogy further it is of course possible to make the television equivalent of a radiogram, those parts otherwise contained in the auxiliary apparatus being built in to the set and a switch being provided for effecting the choice between the various transmitted programmes and the use of a record-producing facility.

One embodiment of the invention will now be described by way of example with reference to the accompanying drawings, in which.

Figure 1:
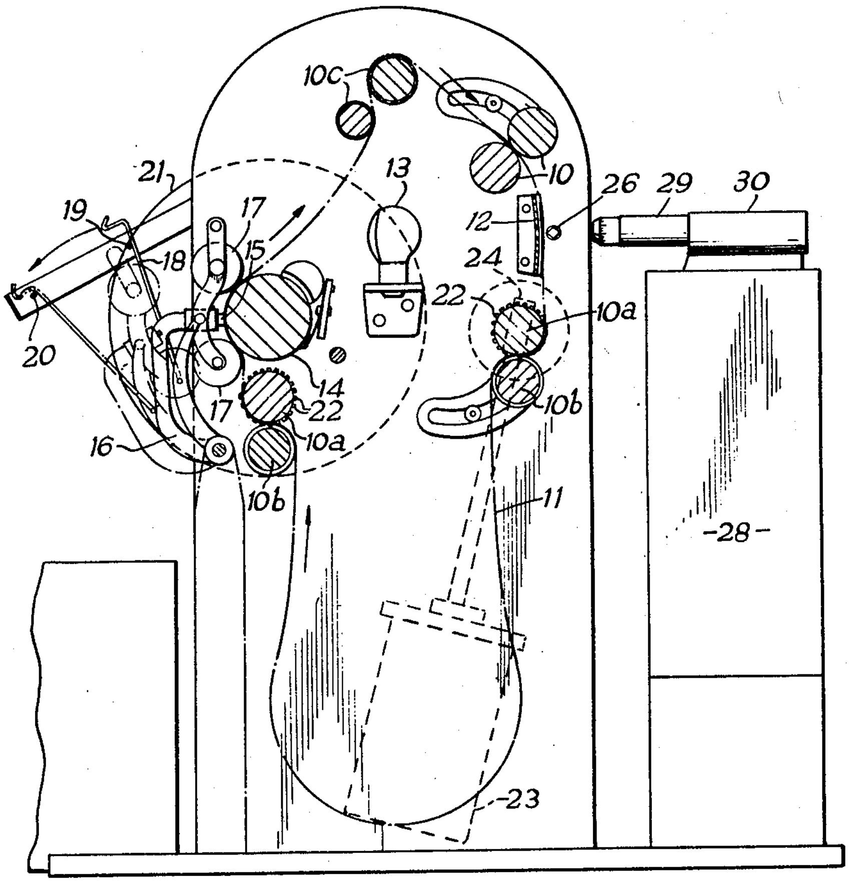
FIG. 1 is an elevational cross-section of an embodiment of the invention.
Figure 2:
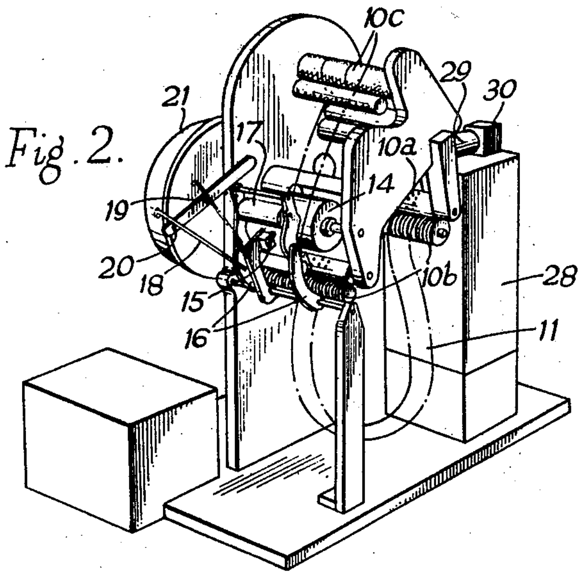
FIGS. 2 and 3 are front and rear perspective views of the apparatus shown in FIG. 1.
Figure 3:
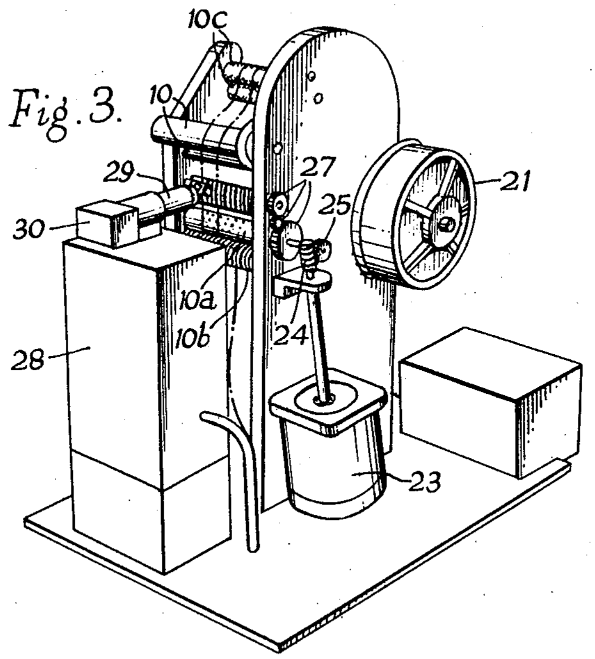
Figure 4:
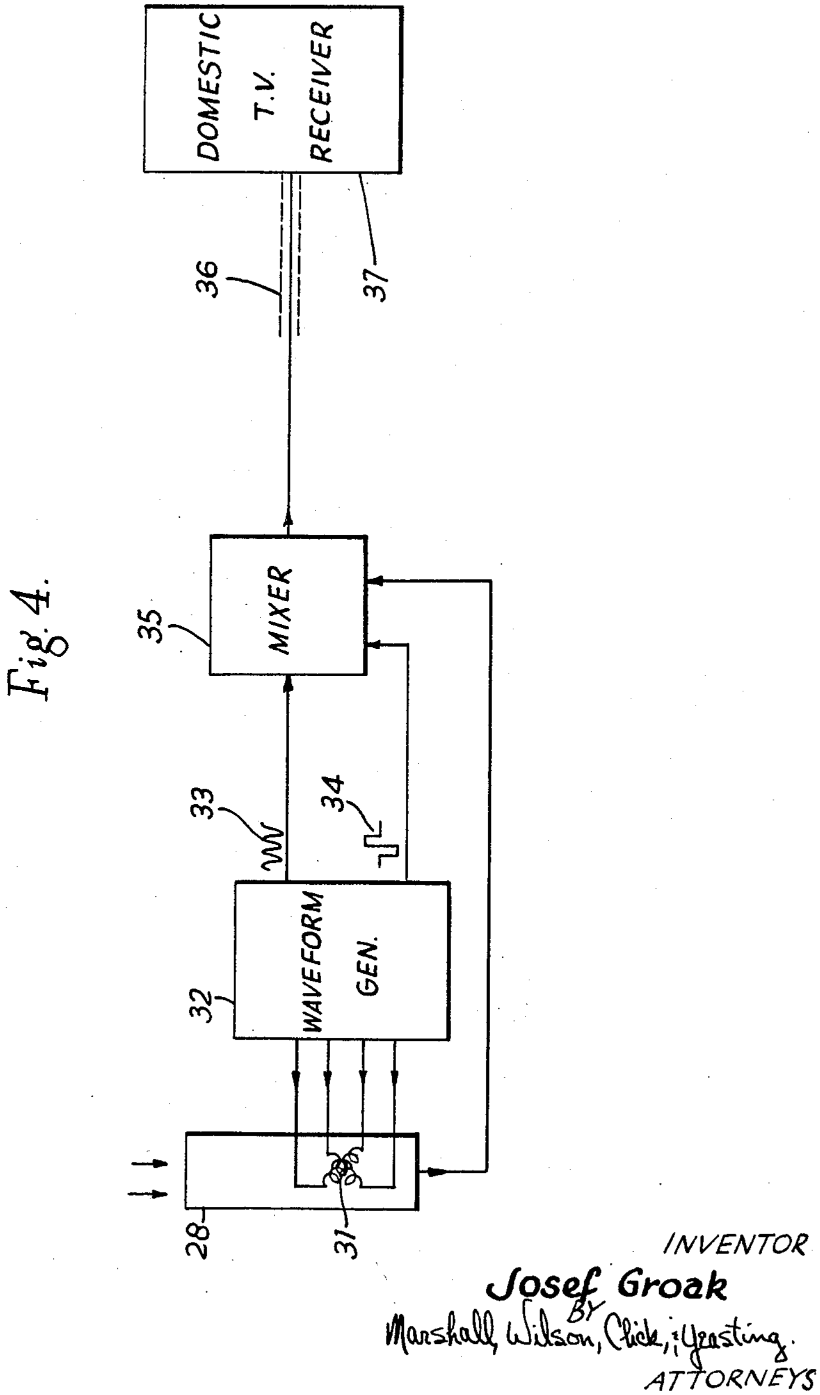
FIG. 4 is a block diagram illustrating a preferred embodiment of circuit connections to be utilized in this invention.

A film feed mechanism comprises an arrangement of cylindrical rollers 10 around which an endless loop 11 of film record may be threaded. The film record used is a transparent record having a helix of picture frames of five turns, between which lie the five turns of an associated magnetic sound track. Corresponding points in the two tracks are separated by approximately half the peripheral length of the loop. The picture and sound tracks are scanned respectively from two horizontally opposed portions of the paths around which the loop travels. A vertical apertured plate 12 is arranged at the first portion and a lamp 13 within the loop illuminate the aperture. A heavy, non-magnetic cylinder 14 of accurate dimensions is arranged at the other portion and a magnetic reproducing head 15 is mounted on a swinging frame 16 so that it may be brought up against the cylinder, as shown in full lines in FIG. 1. The frame also bears two pressure rollers 17 which hold the film in contact with the cylinder 14. The frame is held in the position shown in full lines by means of a spring 18 which bears against a stud 19. The spring 18 can be pulled past the stud 19 and allowed to abut a stud 20, the frame 16 then assuming the position shown in broken lines in FIG. 1. The cylinder 14 is mounted upon a freely rotatable shaft bearing a heavy flywheel 21.

The record also possesses a helical track of perforations, the turns of which lie between those of the track of picture frames and the magnetic track. The record is formed by preparing a strip bearing five tracks of picture frames, five sections of magnetic sound track and five rows of perforations. The strip is joined end to end with a staggered joint so that the three helical tracks described are formed. Along the turns there is one perforation for each two frames, the perforations in one turn lying midway between those of adjacent turns with respect to the length of the record.

The transverse location of the record is maintained by means of four of the cylindrical rollers 10. Two rollers 10a bear axially spaced rings of radially projecting pins 22 located so as to engage with the perforations and these rollers are located below the vertical plate 12 and below the heavy cylinder 14 respectively. The film is held against the rollers 10*a* by means of rollers 10*b* grooved to receive the pins 22. The record is driven at a uniform speed solely by means of a drive to the pinned roller 10*a* below the vertical plate 12, the sense of travel being such that the record is here pulled downwards. The drive comprises a motor 23, a worm 24 and a worm gear 25. The record passes over the outside surface of the vertical plate being pressed lightly against the plate by springs (not shown). The record also passes over the outside surface of the heavy cylinder 14, this being the surface against which the magnetic reproducing head 15 is brought. Light frictional damping is introduced in the upper part of the run of the loop between the cylinder and the vertical plate by means of two non-rotating bars 10*c* covered with felt or other material.

The light from the lamp passes through the aperture in the vertical plate and the portion of film record over the aperture to a prism 26 rotated once for each frame by gears 27 coupled to the gear 25. In this way a stationary image of each frame is formed, the image being thrown on to the screen of a vertically arranged Vidicon 28 by means of an optical system 29 and a fixed prism included in the optical system at 30.

The Vidicon 28 is fixed in a chassis bearing its scanning coils 31 and immediately associated circuits. The operating waveforms for the Vidicon are supplied by a master waveform generator 32. This also generates a carrier oscillation 33 and synchronising pulses 34 and is not described in detail or shown since it may be of conventional form. Circuits for generating television carrier waves and synchronising pulses are well known. The output signals from the Vidicon and the magnetic reproducing head, together with the synchronising pulses are modulated on to the carrier in a conventional mixer 35 and a television waveform of conventional form is thereby generated. This waveform is fed to a coaxial output lead 36 which may be plugged into the aerial socket of an ordinary television receiver 37 designed to operate with the particular conventional waveform and the particular carrier frequency used. No modification is required to the receiver.

When the film feed mechanism is set in motion all the frames in the helix are drawn past the illuminated aperture in succession and the magnetic sound track helix is drawn past the reproducing head. The heavy cylinder 14 and flywheel 21 smooth out any slight irregularities in the motion of the loop past the reproducing head. The staggered joint causes transverse motion of the loop to take place automatically.

A Vidicon being a storage type camera tube no synchronism between the motion of the loop and the scanning waveforms is necessary.

It will be appreciated that more than one television receiver can be fed from the same apparatus.

It will also be appreciated that the pull-down mechanism described need not necessarily be employed. Other mechanisms based on those used in cinematograph apparatus may be employed to give continuous or intermittent motion to the loop. When intermittent motion and a shutter are employed there is of course no need for a rotating prism.

I claim:

1. In combination a television receiver including a picture display means, a storage-type television camera tube, means for causing the scanning means of the picture display means and the camera tube to operate synchronously, means for modulating signal generated by the camera tube on to a carrier and for applying the modulated carrier to the receiver and means for moving a loop of base material bearing a helical track of picture frames adjacent the camera tube and for producing a momentary stationary image of each picture frame which is scanned by the camera tube without any synchronization whatsoever between the movement of the loop and the scanning roster of the tube, whereby the images recorded on the loop are displayed successively on the picture display means.

2. A combination according to claim 1, comprising a magnetic reproducing head adapted to co-operate with the loop of base material to generate electrical signals from a helical magnetic sound track associated with the picture frames.

3. A combination according to claim 1, wherein the means for causing the scanning means of the picture display means and the camera tube to operate synchronously comprise a waveform generator which, in operation, supplied operating potentials to the scanning means of the camera tube generates a carrier wave on to which are modulated the signals provided by the camera tube and superimposes synchronising pulses on the carrier wave.

4. A combination according to claim 1 wherein the loop is mounted on a rotatable drum and wherein the camera tube is arranged to be moved along the axis of the drum by means of a lead screw in order to obtain the relative motion necessary for scanning the helical track of picture frames by the camera tube.

5. A combination according to claim 1 wherein the loop of base material is provided with a pattern of apertures and is driven round by a roller having pins engaging through the apertures.

6. A combination according to claim 5, wherein the loop is a strip joined with a staggered joint, whereby transverse motion of the loop takes place automatically as the joint passes over the roller.

References Cited by the Examiner

UNITED STATES PATENTS

| | | | |
|---|---|---|---|
| 1,442,682 | 1/23 | De Forest | 274—43 |
| 1,786,812 | 12/30 | Zworykin | 178—7.14 |
| 2,292,307 | 8/42 | Warner et al. | 178—5.6 |
| 2,318,118 | 5/43 | Warner et al. | 178—5.6 |
| 2,524,349 | 10/50 | Homrighous | 178—7.2 |

OTHER REFERENCES

"Vidicon for Film Pickup," Journal of the SMPTE, vol. 62, pages 142–151, February 1954.

DAVID G. REDINBAUGH, *Primary Examiner.*

NEWTON N. LOVEWELL, STEPHEN W. CAPELLI, E. JAMES SAX, *Examiners.*